United States Patent
Wakamatsu et al.

[15] 3,653,726
[45] Apr. 4, 1972

[54] ANTI-SKID DEVICE FOR VEHICLES

[72] Inventors: Hisato Wakamatsu; Noriyoshi Ando; Kazu Majima, all of Kariya-shi, Japan

[73] Assignee: Nippon Denso Company Limited, Kariya-shi, Japan

[22] Filed: June 3, 1969

[21] Appl. No.: 829,901

[30] Foreign Application Priority Data

June 3, 1968 Japan.................................43/37904
June 6, 1968 Japan.................................43/38879
Oct. 31, 1968 Japan.................................43/79445
Jan. 11, 1969 Japan.................................44/2177

[52] U.S. Cl............................303/21 CG, 188/181 A, 303/20
[51] Int. Cl.................................................B60t 8/12
[58] Field of Search...............303/21 CG, 20, 21; 73/488, 73/507; 188/181; 324/162; 349/52, 262

[56] References Cited

UNITED STATES PATENTS

| | | | |
|---|---|---|---|
| 3,556,612 | 1/1971 | Ando | 303/21 BE |
| 3,556,614 | 1/1971 | Steigerwald | 303/21 CG |
| 3,507,544 | 4/1970 | Wakamatsu et al. | 303/21 CG |

*Primary Examiner*—Milton Buchler
*Assistant Examiner*—Stephen G. Kunin
*Attorney*—Cushman, Darby & Cushman

[57] ABSTRACT

An anti-skid control device for a vehicle having wheel angular deceleration detecting apparatus for detecting the angular deceleration of the wheel, a switch element actuated by the output from the detecting apparatus so as to supply current to brake force releasing apparatus, and wheel rotation detecting apparatus, which, when the rotation of the wheel is stopped in the closed state of the switch element, is operative by detecting the stoppage of rotation of the wheel to maintain the supply of current to the brake force releasing apparatus until the rotation of the wheel is started again.

2 Claims, 8 Drawing Figures

INVENTORS
Hisato Wakamatsu
Noriyoshi Ando
Kazu Majima

BY Cushman, Darby & Cushman
ATTORNEYS

INVENTORS
Hisato Wakamatsu
Noriyoshi Ando
Kazu Majima

BY Cushman, Darby & Cushman

ATTORNEYS

ANTI-SKID DEVICE FOR VEHICLES

BACKGROUND OF THE INVENTION

1. Field of the Invention

This invention relates generally to anti-skid devices for vehicles and more particularly to an anti-skid control device for a vehicle in which the brake force imparted to the vehicle is released when the angular deceleration of the wheel reaches a predetermined detection setting and in which, when the rotation of the wheel is stopped due to delayed operation of the brake mechanism, the stoppage of rotation of the wheel is detected so that the brake force imparted to the vehicle can continuously be released until the wheel starts to rotate again and the clutch can continuously be released until the driver actuates the clutch again for engagement thereof. Further, this invention relates to an anti-skid device equipped with clutch releasing means which releases the clutch in response to a stoppage of rotation of the wheel due to delayed operation of the brake mechanism so as to thereby facilitate the starting of rotation of the wheel.

2. Description of the Prior Art

Most of the conventional anti-skid control devices for vehicles have been based on an operating principle such that the vehicle is braked to decrease the speed thereof without causing stoppage of rotation of the wheel. In such anti-skid control devices, a flywheel mechanism is employed to detect the angular deceleration of a rotary shaft driven from the drive axle, which angular deceleration is correlated with the circumferential deceleration in meters/sec$^2$ of the wheel of the vehicle, and a hydraulic, electromagnetic or like transmission and driving mechanism is thereby actuated in a direction in which the brake force imparted to the wheel is decreased so as to prevent loss of steerability of the handle, objectionable gyration of the vehicle body and other troubles due to abrupt stoppage of rotation of the wheel resulting from impartating an excessively large brake force.

FIG. 1 is a block diagram of a conventional anti-skid control device of an electromagnetic type applied to a pneumatic brake system and a pneumatic servo hydraulic brake system, and FIG. 2 is a diagrammatic view showing the structure of a detector in the device for detecting the angular deceleration of the wheel drive axle and an electrical connection diagram including the detector. The angular deceleration detector 1 includes a rotary shaft 2 coupled to the wheel drive axle and a flywheel 3 in threaded engagement with the rotary shaft 2 so that rotary torque is developed in the flywheel 3 when angular deceleration is developed in the rotary shaft 2. When rotary torque is developed in the flywheel 3, relative rotation occurs between the flywheel 3 and the rotary shaft 2 against the force of a return spring 4 and thus the position of the flywheel 3 on the rotary shaft 2 varies. Hence, the flywheel 3 moves in the axial direction of the rotary shaft 2 or in the direction of the arrow A. This movement is magnified by a lever 5 which urges an electrical contact 6 toward an opposite contact. Reference numeral 7 designates a relay which relays current from a power source 8 to an electromagnetic valve 9 in response to closure of the electrical contact 6 with the opposite contact. Reference numeral 10 designates an operation indication lamp for informing that the electromagnetic valve 9 is in its energized state. The electromagnetic valve 9 is of the three-way change-over type. More precisely, the air reservoir communicates with the brake chamber through the brake valve in the deenergized state of the valve 9, while in the energized state of the valve 9, supply of air from the air reservoir is shut off and the brake chamber communicates with an air discharge port. When the brake is actuated, air is supplied from the air reservoir into the brake chamber through the brake valve to impart a braking force to the wheel. The electromagnetic valve 9 is energized when a predetermined angular deceleration is developed. Consequently, the air pressure in the brake chamber is reduced to lower the brake force and thus the wheel drive axle is prevented from stopping its rotation.

However, due to the fact that the brake force imparted to the wheel is released only when a signal representing the angular deceleration of the wheel is generated, such an anti-skid control device is defective in that it has an extremely limited range of braking conditions and the anti-skid control operation cannot fully be satisfactorily carried out under a widely varying coefficient of friction between the wheel and a road surface such as a road surface paved with concrete or a frozen road surface covered with ice. Suppose, for example, that the detection point for the signal representing the angular deceleration of the wheel is set at a brake force level suitable for a road surface paved with concrete which gives a high coefficient of friction. In such a case, it is inevitable that the wheel is caused to stop in a very short period of time on a frozen road surface covered with ice, even though the brake force imparted to the wheel is temporarily released, because the air discharge system including the brake chamber is slow in operation. In this connection, it is to be noted that, in the prior art control device, disappearance of any angular deceleration in the wheel results in impartation of the braking force to the wheel again in spite of the fact that the rotation of the wheel is stopped, and the vehicle may skid with the wheel kept locked against rotation. Further, when the driver does not intend to stop the vehicle but merely intends to reduce the vehicle's speed, the above situation results in stoppage of the engine as well as stoppage of the wheel, since the clutch is substantially in its engaged state. Then when the driver tries to accelerate the vehicle by releasing the brake force imparted to the wheel, the vehicle cannot be accelerated unless another source of driving force is used to start the engine again. Moreover, the necessity of abrupt braking does not allow a sufficient time for releasing the clutch, and a similar thing occurs when the vehicle is braked with the clutch kept in its engaged state. Undesirable stoppage of rotation of the wheel on a frozen road surface covered with ice may be obviated when the detection point for the signal representing the angular deceleration of the wheel is set at a very small angular deceleration. However, this results in a problem that an extremely extended braking distance is required until the vehicle is brought to a halt. This problem is especially marked on a road surface paved with concrete and thus the merit of the anti-skid control may thereby be lost.

SUMMARY OF THE INVENTION

It is an object of the present invention to provide an anti-skid control device for a vehicle comprising a wheel angular deceleration detection circuit for detecting the angular deceleration of the wheel, a switch element actuated by the output from said detection circuit so as to supply current to a brake force releasing valve, and a wheel rotation detection circuit which, when the rotation of the wheel is stopped in the closed state of said switch element, is operative to maintain the supply of current to said brake force releasing valve until the rotation of the wheel is started again.

In accordance with the present invention, the brake force releasing valve is actuated to release the brake force imparted to the vehicle by the output from the wheel angular deceleration detection circuit as soon as brake actuation gives rise to an angular deceleration which is larger than a predetermined detection setting of the wheel angular deceleration detection circuit. In addition, in case the rotation of the wheel is stopped due to delayed operation of the brake mechanism, the brake force releasing valve can be kept operated by the output from the wheel rotation detection circuit in order to continuously release the brake force imparted to the vehicle until the rotation of the wheel is started again. Thus, the present invention exhibits an excellent effect that skidding of the vehicle with its wheel locked against rotation can be prevented.

Another object of the present invention is to provide an anti-skid control device for a vehicle of the above character comprising further a second switch element actuated by the output from said wheel rotation detection circuit so as to supply current to a clutch releasing solenoid, and a third switch element for forcedly stopping the current supplying operation of said second switch element, said third switch element including therein a self-holding circuit which is established by the flow of current to said clutch releasing solenoid.

In accordance with the present invention, the output from the wheel rotation detection circuit is used to continuously operate the brake force releasing valve so as to cause rotation of the wheel again from its stopped state, and the output signal from the wheel rotation detection circuit is also supplied to the second switch element to actuate the same. Thus, current is supplied from the second switch element to the clutch releasing solenoid for releasing the clutch so that the clutch interrupts the connection between the wheel and the engine, which is stopped as a result of the instantaneous stoppage of the wheel, in order to facilitate starting of rotation of the wheel. After the output from the wheel rotation detection circuit disappears, the self-holding circuit established in the second switch element due to supply of current to the clutch releasing solenoid holds itself to continuously supply current to the clutch releasing solenoid until the third switch element is actuated. Thus, the present invention exhibits a marked effect in that the anti-skid control operation can be smoothly performed.

A further object of the present invention is to provide an anti-skid control device for a vehicle comprising a wheel angular deceleration detection circuit for detecting the angular deceleration of the wheel, a first switch element actuated by the output from said detection circuit so as to supply current to a brake force releasing valve and a clutch releasing solenoid simultaneously, a self-holding circuit disposed in the circuit of said clutch releasing solenoid, and a second switch element opened and closed in interlocked relation with the actuation of the clutch pedal so as to forcedly stop the supply of current to said clutch releasing solenoid.

In accordance with the present invention, the brake force releasing valve is actuated to release the brake force imparted to the wheel as soon as brake actuation gives rise to an angular deceleration which is larger than a predetermined detection setting of the wheel angular deceleration detection circuit, and at the same time, current is supplied to the clutch releasing solenoid to keep the clutch in its released state so as to thereby safely and efficiently brake the vehicle without bringing forth undesirable stoppage of the wheel and the resultant stoppage of the engine. In addition, when it is desired to accelerate the vehicle upon completion of the anti-skid operation, the second switch element may merely be actuated to accelerate the vehicle, thus eliminating a troublesome procedure encountered with the prior art devices in which other source of driving force must be used to drive the engine again which has stopped in simultaneous relation with the stoppage of the rotation of the wheel.

A yet further object of the present invention is to provide an anti-skid control device for a vehicle of the above character comprising further a wheel rotation detection circuit which, when the rotation of the wheel is stopped in the closed state of said first switch element, is operative to maintain the supply of current to said brake force releasing valve until the rotation of the wheel is started again.

In accordance with the present invention, the brake force releasing valve, once actuated, is kept in its actuated state by the output from the wheel rotation detection circuit even after the output from the wheel angular deceleration detection circuit has disappeared due to stoppage of rotation of the wheel as a result of delayed operation of the brake mechanism, and at the same time, the self-holding circuit disposed in the circuit of the clutch releasing solenoid which is now energized acts to keep the clutch in its released state so that the wheel can very easily be rotated again. Thus, the present invention exhibits a marked effect that the engine is prevented from stopping because the clutch is urged to its released state as soon as the rotation of the wheel is stopped, and release of the brake force imparted to the vehicle does not give rise to skidding of the vehicle with its wheel locked against rotation.

DESCRIPTION OF THE PREFERRED EMBODIMENTS

Figure 1:
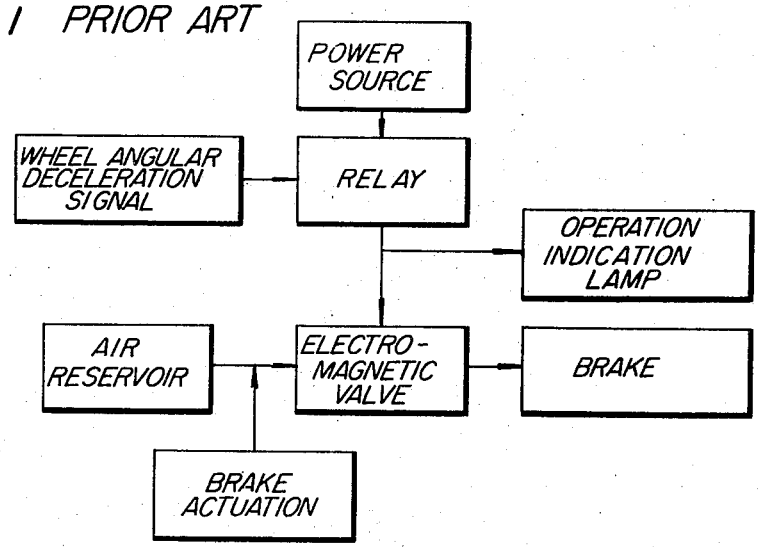
FIG. 1 is a block diagram of an electromagnetic type of anti-skid control device for a vehicle well known in the art.
Figure 2:
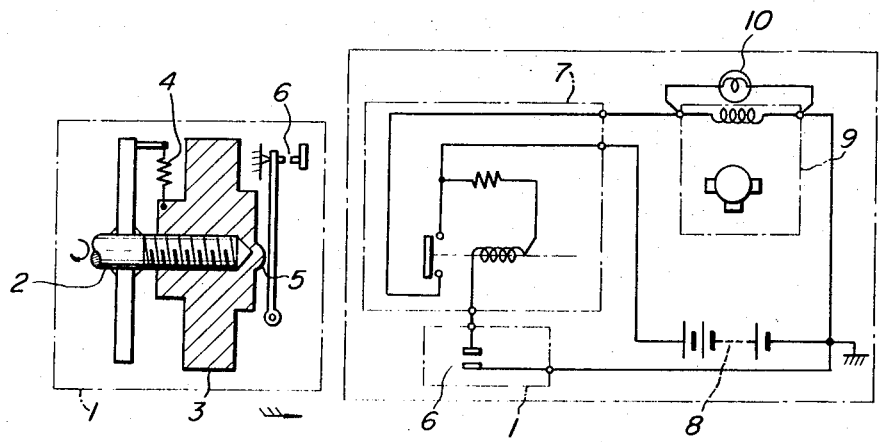
FIG. 2 is an electrical connection diagram of part of the electromagnetic type of anti-skid control device shown in FIG. 1.
Figure 3:
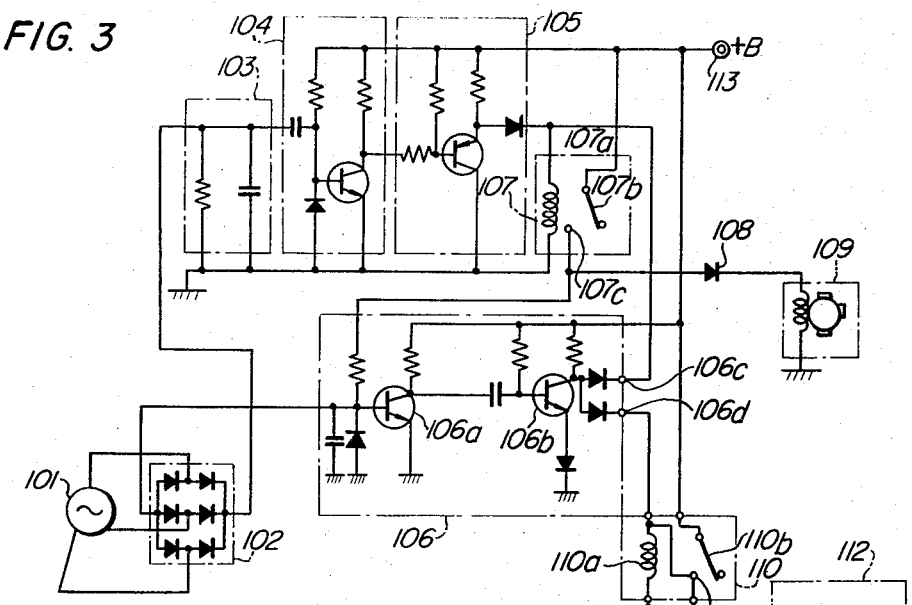
FIG. 3 is an electrical connection diagram of an embodiment of the anti-skid control device according to the present invention.

Referring to FIG. 3, the anti-skid control device according to the present invention includes a three-phase A.C. generator 101 whose rotor is rotated at a speed proportional to the rotating speed of the wheel of a vehicle so as to generate an A.C. voltage proportional to the rotating speed of the wheel. The A.C. voltage generated by the A.C. generator 101 is rectified by a three-phase full-wave rectifying circuit 102. Reference numeral 103 designates a smoothing circuit which eliminate A.C. components in the voltage rectified by the rectifying circuit 102 for obtaining a D.C. voltage. Reference numeral 104 designates a wheel angular deceleration detection circuit which is operated by the D.C. voltage supplied from the smoothing circuit 103. A switching circuit 105 is urged to its cut-off state in response to detection of an angular deceleration by the angular deceleration detection circuit 104. Reference numeral 106 designates a wheel rotation detection circuit which includes an input transistor 106a, an output transistor 106b, and output terminals 106c and 106d. Reference numeral 107 designates a first switch element which includes an energizing coil 107a, a movable contact 107b urged by the electromagnetic force of attraction developed by the energizing coil 107a, and a stationary contact 107c disposed opposite to the movable contact 107b. Although a relay is used to form the first switch element 107 in the embodiment shown in FIG. 3, the relay may be replaced by another switching element, such as a transistor. Reference numeral 108 designates a diode. Reference numeral 109 designates a brake force releasing valve which operates in response to closure of the movable contact 107b with the stationary contact 107c so as to release the brake force imparted to the vehicle. Reference numeral 110 designates a second switch element which includes an energizing coil 110a, a movable contact 110b, and a stationary contact 110c disposed opposite to the movable contact 110b. Reference numeral 111 designates a third switch element which is provided to forcedly stop the current supplying operation of the second switch element 110. The third switch element 111 is in the form of a push button switch which is normally closed. Reference numeral 112 designates a clutch releasing solenoid which acts to release a clutch (not shown) when the movable contact 110b is brought into contact with the stationary contact 110c. Reference numeral 113 designates a terminal which is connected to the positive electrode of a storage battery mounted on the vehicle.

The operation of the device of the present invention having the above-described structure will be described hereunder.

Suppose that the rotation of the wheel is reduced with an angular deceleration which is larger than a fixed angular deceleration and thereafter the rotation of the wheel is stopped. As the rotating speed of the wheel is reduced, the output voltage of the three-phase A.C. generator 101 is also reduced, and as a result, the D.C. voltage appearing at the output terminal of the smoothing circuit 103 is reduced. When the D.C. voltage appearing at the output terminal of the smoothing circuit 103 is reduced at a rate which is more than a fixed valve determined by the wheel angular deceleration detection circuit 104, a deceleration signal is delivered from the deceleration detection circuit 104 to urge the switching circuit 105 to its cut-off state. Consequently, current is supplied to the energizing coil 107a of the first switch element 107 so that the movable contact 107b is brought into contact with the stationary contact 107c and current is supplied to the brake force releasing valve 109 through the diode 108. When thereafter the rotation of the wheel is stopped due to the delayed operation of the brake mechanism, the wheel rotation detection circuit 106 detects the stoppage of rotation of the wheel and a signal voltage appears at the output terminal 106c of the wheel rotation detection circuit 106. In this case, the deceleration signal is no longer delivered from the wheel angular deceleration detection circuit 104 due to the fact that the wheel has stopped its rotation. However, the energizing coil 107a is continuously supplied with current by the signal voltage appearing at the output terminal 106 c of the wheel rotation detection circuit 106 until the rotation of the wheel is started again. Thus, the movable contact 107b is kept in its contacting state with the stationary contact 107c and the brake force releasing valve 109 is kept in its brake force releasing position. Further, due to the fact that the signal voltage appears also at another output terminal 106d, current is supplied to the energizing coil 110a of the second switch element 110 so that the movable contact 110b is brought into contact with the stationary contact 110c to supply current to the clutch releasing solenoid 112. Therefore, the clutch is released to interrupt the connection between the wheel and the engine which is brought to a halt as a result of instantaneous stoppage of rotation of the wheel, thereby facilitating the starting of rotation of the wheel. As the movable contact 110b is brought into contact with the stationary contact 110c and current is supplied to the clutch releasing solenoid 112, a self-holding circuit is established which is traced from the movable contact 110b, stationary contact 110c and energizing coil 110a to the third switch element 111. As a result, current is continuously supplied to the clutch releasing solenoid 112 even after the signal voltage at the output terminal 106d has disappeared. Thereafter, each time the wheel rotation is stopped in the course of the anti-skid control operation, the wheel rotation detection circuit 106 and the first switch element 107 are operated to facilitate the starting of rotation of the wheel thereby ensuring satisfactory anti-skid control operation. Upon completion of the anti-skid control operation, the driver may temporarily urge the third switch element 111 to its open position so as to forcedly interrupt the current supply to the solenoid 112 and to place the clutch in its engaged state again.

Figure 4:
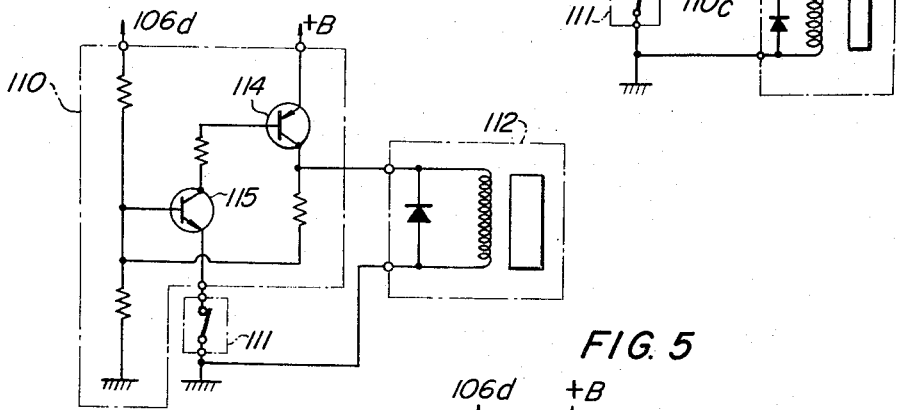
FIGS. 4 and 5 are electrical connection diagrams showing parts of other embodiments of the anti-skid control device according to the present invention.

Although a relay is used to form the second switch element 110 in the embodiment shown in FIG. 3, the second switch element 110 may be constituted of two transistors 114 and 115 as shown in FIG. 4. In a modification shown in FIG. 4, the emitter of the transistor 114 is connected to the terminal 113, while the base of the transistor 115 is connected through a resistor to the output terminal 106d of the wheel rotation detection circuit 106. The operation of the second switch element 110 shown in FIG. 4 will now be described. An output signal appears at the output terminal 106d of the wheel rotation detection circuit 106 in response to stoppage of rotation of the wheel and the transistors 114 and 115 are thereby urged to their conducting state. Collector current of the transistor 114 is supplied to the clutch releasing solenoid 112 to release the clutch. As the wheel starts its rotation and the output signal at the output terminal 106d disappears, part of the collector current of the transistor 114 flows into the base of the transistor 115 and a self-holding circuit is thereby established and makes a self-holding operation.

Figure 5:
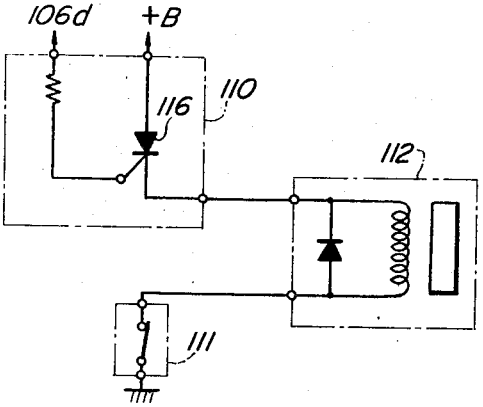

The second switch element 110 shown in FIG. 3 may be in the form of a silicon controlled rectifier 116 as shown in FIG. 5. In a modification shown in FIG. 5, the anode and gate of the silicon controlled rectifier 116 are connected to the terminal 113 and the output terminal 106d of the wheel rotation detection circuit 106, respectively. The operation of the second switch element 110 shown in FIG. 5 will now be described. An output signal appears at the output terminal 106d of the wheel rotation detection circuit 106 in response to stoppage of rotation of the wheel and is supplied to the gate of the silicon controlled rectifier 116 as a gate signal thereby urging the silicon controlled rectifier 116 to its turned-on state. The clutch releasing solenoid 112 is thereby energized to release the clutch. Needless to say, the silicon controlled rectifier 116 is kept in its turned-on state even in the absence of any gate signal once it is turned on. Thus, the silicon controlled rectifier 116 itself constitutes a self-holding circuit and makes a self-holding operation.

Figure 6:
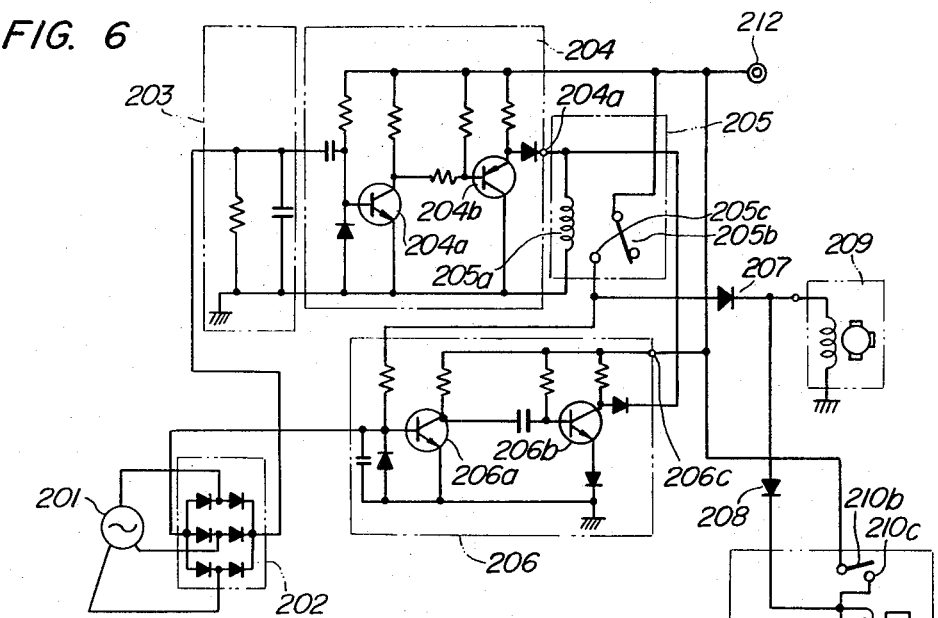
FIG. 6 is an electrical connection diagram of another embodiment of the anti-skid control device according to the present invention.

Referring to FIG. 6, another embodiment of the anti-skid control device according to the present invention includes a three-phase A.C. generator 201 whose rotor is rotated at a speed proportional to the rotating speed of the wheel of a vehicle so as to generate an A.C. voltage proportional to the rotating speed of the wheel. The A.C. voltage generated by the A.C. generator 201 is rectified by a three-phase full-wave rectifying circuit 202. Reference numeral 203 designates a smoothing circuit which eliminates A.C. components in the voltage rectified by the rectifying circuit 202 for obtaining a D.C. voltage. Reference numeral 204 designates a wheel angular deceleration detection circuit which is operated by the D.C. voltage supplied from the smoothing circuit 203. The wheel angular deceleration detection circuit 204 includes a deceleration detecting transistor 204a, a switching transistor 204b and an output terminal 204c. Reference numeral 205 designates a first switch element which includes an energizing coil 205a, a movable contact 205b urged by the electromagnetic force of attraction developed by the energizing coil 205a, and a stationary contact 205c disposed opposite to the movable contact 205b. Although a relay is used to form the first switch element 205 in the embodiment shown in FIG. 6, the relay may be replaced by another switch element, such as a transistor. Reference numeral 206 designates a wheel rotation detection circuit which includes a wheel rotation detecting transistor 206a, a switching transistor 206b and an output terminal 206c. Reference numerals 207 and 208 designate diodes. Reference numeral 209 designates a brake force releasing valve which operates in response to closure of the movable contact 205b with the stationary contact 205c to release the brake force imparted to the vehicle. Reference numeral 210 designates a clutch releasing solenoid which includes an energizing coil 210a, a movable contact 210b urged by the electromagnetic force of attraction developed by the energizing coil 210a, a stationary contact 210c disposed opposite to the movable contact 210b, and an armature 210d connected to a clutch (not shown). Thus, when current is supplied to the energizing coil 210a, the armature 210d is attracted by the electromagnetic force of attraction of the energizing coil 210a to release the clutch. Reference numeral 211 designates a normally-closed second switch element which is urged to its open position when the driver actuates the clutch pedal to release the clutch.

The operation of the device of the present invention shown in FIG. 6 will now be described. Suppose that the rotation of the wheel is reduced with an angular deceleration which is larger than a fixed angular deceleration and thereafter the rotation of the wheel is stopped. As the rotating speed of the wheel is reduced, the output voltage of the three-phase A.C. generator 201 is also reduced, and as a result, the D.C. voltage appearing at the output terminal of the smoothing circuit 203 is reduced. When the D.C. voltage appearing at the output terminal of the smoothing circuit 203 is reduced at a rate which is more than a fixed value determined by the wheel angular deceleration detection circuit 204, the deceleration detecting transistor 204a and the switching transistor 204b in the deceleration detection circuit 204 are urged to their cut-off state so that current is supplied to the energizing coil 205a from a terminal 212 and the movable contact 205b is thereby brought into contact with the stationary contact 205c. Consequently, current is supplied from the terminal 212 to the brake force releasing valve 209 through the contacts 205b, 205c and the diode 207 and the valve 209 is operated in a direction in which the brake force imparted to the vehicle is released. In simultaneous relation to the above operation, the current is also supplied to the energizing coil 210a of the clutch releasing solenoid 210 through the diode 208 to release the clutch. Since the movable contact 210b is brought into contact with the stationary contact 210c as a result of the current supplied to the energizing coil 210a, a self-holding circuit is established which can continuously maintain the current supply to the energizing coil 210a even after the angular deceleration in the wheel has disappeared due to release of the brake force imparted to the vehicle by the supply of current to the brake force releasing valve 209. In case the rotation of the wheel is stopped due to delayed operation of the brake mechanism in spite of the fact that the brake force releasing valve 209 is actuated, the wheel rotation detection circuit 206 detects the stoppage of rotation of the wheel, and as a result, a signal voltage appears at the output terminal 206c thereof. Thus, although the signal voltage is no longer delivered from the wheel angular deceleration detection circuit 204 due to the fact that the wheel has stopped its rotation, the energizing coil 205a is continuously supplied with current by the signal voltage appearing at the output terminal 206c of the wheel rotation detection circuit 206 until the rotation of the wheel is started again. Thus, the movable contact 205b is kept in its contacting state with the stationary contact 205c and the brake force releasing valve 209 is kept in its brake force releasing position. Since the energizing coil 210a is also continuously supplied with current to keep the clutch in its released state, the wheel can start its rotation very easily. Upon completion of the anti-skid control operation, the driver actuates the clutch to stop the current supply to the energizing coil 210a and thereafter the clutch can freely be released or engaged by the clutch pedal actuation of the driver.

Figure 7:
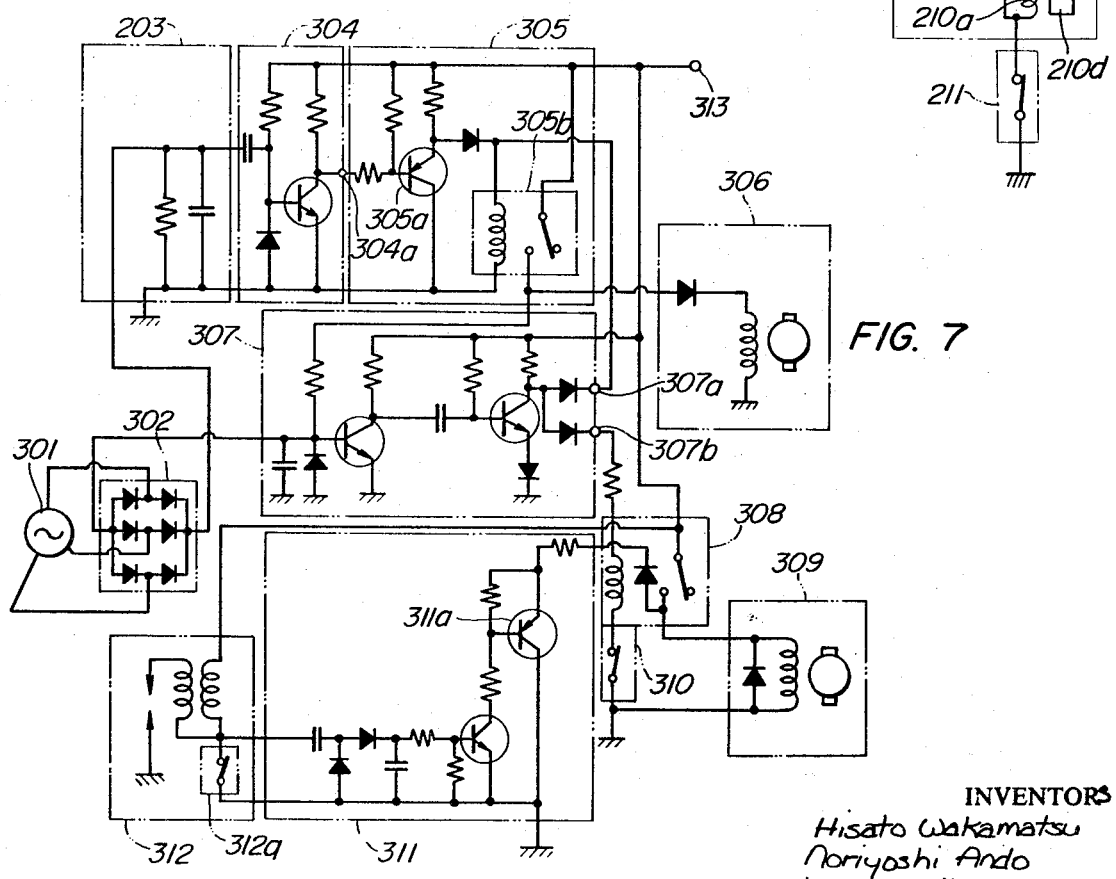
FIG. 7 is an electrical connection diagram of an embodiment of the anti-skid control device equipped with clutch releasing means according to the present invention.

Referring to FIG. 7, a further embodiment of the anti-skid control device according to the present invention includes an A.C. generator 301 which generates an A.C. voltage proportional to the rotating speed of the wheel of a vehicle. The A.C. voltage generated by the A.C. generator 301 is rectified by a rectifying circuit 302. Reference numeral 303 designates a smoothing circuit which smoothes out the pulsating voltage delivered from the rectifying circuit 302. Reference numeral 304 designates a differentiation circuit which is operated by the D.C. voltage supplied from the smoothing circuit 303 so that an output signal voltage appears at its output terminal 304a when the circumferential deceleration of the wheel reaches a predetermined setting. The A.C. generator 301, the rectifying circuit 302, the smoothing circuit 303 and the differentiation circuit 304 described above constitute a wheel circumferential deceleration detector. Reference numeral 305 designates a switch element which includes a transistor 305a urged to its cut-off state in response to the appearance of an output signal voltage at the output terminal 304a of the differentiation circuit 304, and a relay 305b urged to its closed position in response to cut-off of the transistor 305a. Reference numeral 306 designates a brake force releasing element which operates in response to the closure of the relay 305b to release the brake force imparted to the vehicle. Reference numeral 307 designates a wheel rotation detection circuit which is so constructed that an output signal voltage appears at its output terminals 307a and 307b when the rotation of the wheel is stopped under the condition that the circumferential deceleration of the wheel exceeds the predetermined setting and current is supplied to the brake force releasing element 306. When an output signal voltage appears at the output terminal 307a, the relay 305b can be continuously kept in its closed state until the wheel starts its rotation again even after the output signal voltage appearing at the output terminal 304a of the differentiation circuit 304 has disappeared. Reference numerals 308 and 309 designate a switch element and a clutch releasing element, respectively. Reference numeral 310 designates a normally-closed switch element which can be urged to its open position by the actuation of the driver. Reference numeral 311 designates an engine rotation detection circuit having a transistor 311a which is urged to its cut-off state in response to stoppage of the engine. Reference numeral 312 designates an ignition means for the engine. The ignition means 312 includes a distributor contact unit 312a. Reference numeral 313 designates a terminal connected to a storage battery (not shown) mounted on the vehicle.

The operation of the device of the present invention shown in FIG. 7 will now be described. When the circumferential deceleration of the wheel exceeds the predetermined setting and thereafter the rotation of the wheel is stopped, current is supplied to the brake force releasing element 306 until the wheel starts to rotate again. In such a case, the rotation of the engine will be stopped in simultaneous relation with the stoppage of the rotation of the wheel unless the driver actuates the clutch to release the same. Accordingly, the distributor contact unit 312a in the ignition means 312 does not make its current interrupting operation and the transistor 311a in the engine rotation detection circuit 311 is urged to its cut-off state from the previous conducting state. In the meantime, the switch element 308 is urged to its closed state by the output signal voltage appearing at the output terminal 307b of the wheel rotation detection circuit 307 to supply current to the clutch releasing element 309 for releasing the clutch. Upon completion of the anti-skid control operation, the driver may open the switch 310 to cut off the supply of current to the clutch releasing element 309 for bringing the clutch to its engaged state again. When the rotation of the wheel is stopped but the engine is still under rotation, that is, when the driver actuates the clutch to release the same, no current is supplied to the switch element 308, hence no current is supplied to the clutch releasing element 309 because the transistor 311a is in its conducting state. Further, when the driver releases the clutch and then intentionally stops the rotation of the engine in spite of the fact that the vehicle is running, no current is supplied to the clutch releasing element 309 because no output signal appears at the output terminal 307b though the transistor 311a is urged to its cut-off state.

Figure 8:
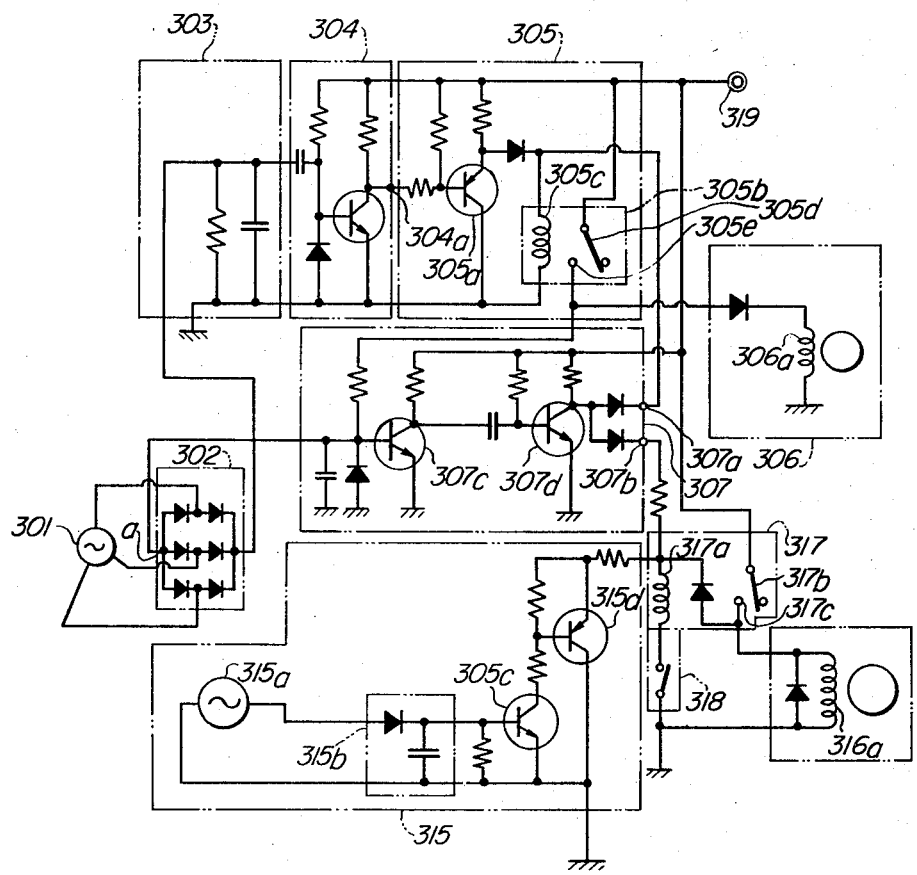
FIG. 8 is an electrical connection diagram of another embodiment of the anti-skid control device equipped with clutch releasing means according to the present invention.

Referring to FIG. 8, a still further embodiment of the anit-skid control device according to the present invention includes an A.C. generator 301 which generates an A.C. voltage proportional to the rotating speed of the wheel of a vehicle. The A.C. voltage generated by the A.C. generator 301 is rectified by a rectifying circuit 302. Reference numeral 303 designates a smoothing circuit which smoothes out the pulsating voltage delivered from the rectifying circuit 302. Reference numeral 304 designates a differentiation circuit which derives a variation in the smoothed D.C. voltage delivered from the smoothing circuit 302. More precisely, the differentiation circuit 304 detects the circumferential deceleration of the wheel which is obtained by differentiating the circumferential speed of the wheel with time. When the detected circumferential deceleration of the wheel reaches a predetermined setting, a signal voltage appears at an output terminal 304a of the differentiation circuit 304 for forcedly releasing the brake force imparted to the wheel. The A.C. generator 301, the rectifying circuit 302, the smoothing circuit 303 and the differentiation circuit 304 described above constitute a wheel circumferential deceleration detector or lock detector which is brought into action the moment immediately before the wheel is locked due to an excessively large brake force. Reference numeral 305 designates a switch element which includes a transistor 305a urged to its cut-off state in response to appearance of an output signal voltage at the output terminal 304a of the differentiation circuit 304, and a relay 305b urged to its closed position in response to cut-off of the transistor 305a. The relay 305b includes an energizing coil 305c, a movable contact 305d and a stationary contact 305e. Reference numeral 306 designates a brake force releasing element which includes an energizing coil 306a. When the differentiation circuit 304 delivers a signal for forcedly releasing the brake force and current is then supplied to the energizing coil 305c of the relay 305b thereby bringing the movable contact 305d into contact with the stationary contact 305e, current is supplied to the energizing coil 306a of the brake force releasing element 306 so that the releasing element 306 operate to forcedly release the brake force independently of the will of the driver to release the brake force with manual power. Reference numeral 307 designates a wheel rotation detection circuit which detects as to whether or not the wheel is rotating. The wheel rotation detection circuit 307 includes two switching transistors 307c and 307d, and output terminals 307a and 307b connected to the collector of the transistor 307d. When the A.C. generator 301 is generating voltage, that is, when the wheel is under rotation, negative voltage appearing at the negative electrode terminal a of the rectifying circuit 302 is applied to the base of the transistor 307c in the preceding stage and the transistor 307c is placed in its cut-off state. Therefore, the transistor 307d in the succeeding stage is in its conducting state and a voltage substantially equal to zero volt appears at the output terminals 307a and 307b to indicate that the wheel is rotating. Further, when the wheel is locked against rotation in spite of the fact that the signal for forcedly releasing the brake force is delivered from the differentiation circuit 304 to urge the relay 305b to its closed state and current is thereby supplied to the energizing coil 306a of the brake force releasing element 306, base current is supplied from a power source through the relay 305b to the base of the transistor 307c in the preceding stage of the wheel rotation detection circuit 307 to urge the transistor 307c to its conducting state, and as a result, the transistor 307d in the succeeding stage is urged to its cut-off state so that a voltage substantially equal to the power supply voltage appears at the output terminals 307a and 307b to indicate that the wheel is locked against rotation. In the above case, current is continuously supplied from the output terminal 307a to the energizing coil 305c of the relay 305b in order to continuously maintain the closed state of the relay 305b until the wheel starts its rotation again even after the output signal voltage at the output terminal 304a of the differentiation circuit 304 has disappeared due to stoppage of rotation of the wheel. Reference numeral 315 designates an engine rotation detection circuit which detects whether or not the engine is rotating. The engine rotation detection circuit 315 includes a generator 315a driven in correlation with the rotation of the engine, a rectifying and smoothing circuit 315b connected to the output terminal of the generator 315a, and transistors 315c and 315d connected to the output terminal of the rectifying and smoothing circuit 315b. It is so arranged that the transistors 315c and 315d are in their conducting state when the generator 315a is generating voltage, that is, when the engine is rotating, and are in their cut-off state when the generator 315a ceases to generate voltage, that is, when the engine ceases its rotation. Reference numeral 316 designates a clutch releasing element which includes an energizing coil 316a. The clutch releasing element 316 is such that, when current is supplied to the energizing coil 316a, the clutch in its engaged state is forcedly released independently of the will of the driver to release the brake force with manual power. Reference numeral 317 designates a relay having a self-holding circuit therein. The relay 317 includes an energizing coil 317a, a movable contact 317b, and a stationary contact 317c connected to the energizing coil 316a of the clutch releasing element 316. In case the wheel is locked against rotation and the rotation of the engine is also stopped in spite of the fact that a signal voltage appears at the output terminal 307b of the wheel rotation detection circuit 307 and the transistors 315c and 315d in the engine rotation detection circuit 315 are urged to their cut-off state, that is, the differentiation circuit 304 delivers a signal for forcedly releasing the brake force, current is supplied to the energizing coil 317a of the relay 317 to bring the movable contact 317b into contact with the stationary contact 317c for supplying current to the energizing coil 316a of the clutch releasing element 316, and at the same time, the relay 317 holds itself to maintain its closed state thereby to continuously supply current to the energizing coil 316a until its self-holding operation is released. Reference numeral 318 designates a normally-closed switch element which, when temporarily opened by the driver, acts to release the self-holding operation of the relay 317 thereby to stop the supply of current to the energizing coil 316a and to restore the clutch to its engaged position. Reference numeral 319 designates a terminal connected to the positive electrode of a storage battery mounted on the vehicle.

The operation of the device of the present invention shown in FIG. 8 will now be described. The lock detector detects the circumferential deceleration developed in the wheel due to brake actuation by the driver. When the circumferential deceleration exceeds a predetermined setting, the differentiation circuit 304 delivers a signal for forcedly releasing the brake force, and current is thereby supplied to the energizing coil 305c of the relay 305b to bring the movable contact 305d into contact with the stationary contact 305e. Current is thereby supplied to the energizing coil 306a of the brake force releasing element 306 to forcedly release the brake force imparted to the wheel. However, delayed operation of the brake mechanism may result in a situation that the brake force cannot instantaneously be released and the wheel is locked against rotation in spite of the fact that current is supplied to the energizing coil 306a of the brake force releasing element 306. In such a case, due to stoppage of rotation of the A.C. generator 301 and closure of the relay 305b, base current is supplied, from the power source to the preceding transistor 307c in the wheel rotation detection circuit 307 thereby to urge the transistor 307c to its conducting state. This is followed by cut-off of the succeeding transistor 307d, and a signal voltage substantially equal to the power supply voltage appears at the output terminals 307a and 307b. Current due to the signal voltage appearing at the output terminal 307a flows into the energizing coil 305c of the relay 305b to maintain the relay 305b in its closed state even after the wheel has been locked against rotation and no output signal has been delivered from the lock detector. Thus, current is continuously supplied to the energizing coil 306a of the brake force releasing element 306 so as to continuously release the brake force. After a certain delay time which is dependent on the delayed operation of the brake mechanism, the brake force releasing element 306 acts to forcedly release the brake force, and as a result, the wheel placed in the locked state starts to rotate again. The relay 305b is maintained in its closed state for the above-described period of time. As soon as the wheel starts rotation, negative voltage is applied to the base of the preceding transistor 307c in the wheel rotation detection circuit 307 again and the succeeding transistor 307d is urged to its conducting state so that a signal voltage substantially equal to zero volt appears at the output terminal 307a.

Suppose a case in which the brake is actuated without releasing the clutch and locking of the wheel results, since abrupt braking is required and there is not sufficient time to release the clutch. In such a case, the rotation of the engine is stopped simultaneously with the locking of the wheel because the engine is connected to the wheel through the clutch. The generator 315a ceases to generate voltage and the transistors 315c and 315d are urged to their cut-off state. Current due to a signal voltage appearing at the output terminal 307b of the wheel rotation detection circuit 307 as a result of the locking of the wheel flows to the energizing coil 317a of the relay 317 to bring the movable contact 317b into contact with the stationary contact 317c thereby supplying current to the energizing coil 316a of the clutch releasing element 316 for forcedly releasing the clutch. Thus, the wheel is not loaded with the stopped engine but is only loaded with the vehicle body. The released state of the clutch is maintained by the self-holding operation of the relay 317 until the switch element 318 is urged to its open position. After a certain delay time which is dependent on delaying operation of the brake mechanism, the brake force releasing element 306 releases the brake force imparted to the wheel and the wheel is imparted with a rotating force by the vehicle body which is advancing by the force of inertia. Thus, the wheel can easily start to rotate even on a road surface such as a frozen road surface covered with ice which has a small coefficient of friction between it and the wheel, and undesirable skidding of the vehicle with its wheel locked against rotation can positively be prevented. When it is necessary to engage the clutch as in the case of accelerating the vehicle, the switch element 318 may temporarily be urged to its open position to release the self-holding operation of the relay 317. More precisely, by opening the current path to the energizing coil 317a of the relay 317, current supply to the energizing coil 316a of the clutch releasing element 316 is interrupted and the clutch is then engaged.

When the wheel is locked against rotation but the engine does not cease its rotation, that is, when the driver releases the clutch and actuates the brake resulting in the locking of the wheel, the transistors 315c and 315d in the engine rotation detection circuit 315 are in their conducting state due to the fact that the engine is under rotation. In this case, no current is supplied to the energizing coil 317a of the relay 317 and hence no current is supplied to the energizing coil 316a of the clutch releasing element 316, thus preventing any defective operation. Further, suppose a case in which the driver intentionally stops the rotation of the engine after releasing the clutch in spite of the fact that the vehicle is running. In such a case, although the transistors 315c and 315d in the engine rotation detection circuit 315 are urged to their cut-off state, no output signal appears at the output terminals 307a and 307b of the wheel rotation detection circuit 307, and hence no current supplied to the energizing coil 316a of the clutch releasing element 316 since the engine is under rotation.

The generator 315a in the engine rotation detection circuit 315 in the embodiment shown in FIG. 8 may be one especially provided for the purpose. However, existing a generator for charging storage batteries may be employed for this service in lieu of the generator 315a. This is very economical as there is no need to allow for space for disposing such a special generator. Although the generator 315a in the embodiment shown in FIG. 8 is in the form of an A.C. generator, it will be understood that a D.C. generator, pulse generator or the like may be employed in lieu of an A.C. generator. Further, in the embodiment shown in FIG. 8, a lock detector of such a kind is employed that it derives the circumferential speed of the wheel as an electrical quantity, electrically differentiates the quantity to obtain a circumferential deceleration and, on the basis of the deceleration, detects the moment immediately before locking of the wheel takes place. However, it will be understood that the lock detector may be such that it detects electrically or mechanically the slip ratio of the wheel or deceleration of the vehicle body or the relation between the deceleration of the vehicle body and the circumferential deceleration of the wheel and, on the basis of the above value, detects the moment immediately before locking of the wheel takes place.

What is claimed is:

1. An anti-skid control device for use in a wheeled vehicle having brake force releasing means, said device comprising:
   means for providing an output signal upon detecting wheel angular deceleration exceeding a predetermined amount,
   switching means in circuit with said detecting means and having two conditions one of which is normal and the other of which is effected in response to said detecting means output signal for actuating said brake force releasing means, and
   wheel rotation detection means having an output terminal connected to the said switching means and an enabling input terminal connected in circuit with said switching means and being enabled only by said second condition thereof to detect a locked wheel condition for maintaining the actuation of said brake force releasing means even after disappearance of said output signal from said detecting means only so long as said locked wheel condition continues.

2. A device as in claim 1 wherein said switching means includes a relay having a coil connected to said deceleration detecting means and to said output terminal and a contact movable in response to energization of said coil by said output signal from said normal condition to said other condition to switch an enabling bias to said enabling input terminal of said wheel rotation detection means only while said relay coil is energized so as to prevent operation of said brake force releasing means by said switching means unless the switching means is first operated by the deceleration detecting means output signal as opposed to the output of said wheel rotation detection means.

* * * * *